(12) United States Patent
Howe et al.

(10) Patent No.: US 9,873,468 B2
(45) Date of Patent: Jan. 23, 2018

(54) VERSATILE OFF-ROAD CHAIR

(71) Applicant: Howe and Howe Technologies, Inc., Waterboro, ME (US)

(72) Inventors: Michael David Howe, South Berwick, ME (US); Geoffrey Scott Howe, North Berwick, ME (US)

(73) Assignee: Howe and Howe Technologies, Inc., Waterboro, ME (US)

( * ) Notice: Subject to any disclaimer, the term of this patent is extended or adjusted under 35 U.S.C. 154(b) by 50 days.

(21) Appl. No.: 14/815,454

(22) Filed: Jul. 31, 2015

(65) Prior Publication Data

US 2016/0031501 A1    Feb. 4, 2016

Related U.S. Application Data

(60) Provisional application No. 62/032,009, filed on Aug. 1, 2014.

(51) Int. Cl.

| | |
|---|---|
| *B62D 55/02* | (2006.01) |
| *B60N 2/00* | (2006.01) |
| *B62D 25/20* | (2006.01) |
| *B62D 63/02* | (2006.01) |
| *B62D 65/02* | (2006.01) |
| *B60N 2/24* | (2006.01) |
| *B62D 51/02* | (2006.01) |
| *B62D 55/06* | (2006.01) |

(52) U.S. Cl.
CPC ............ *B62D 63/02* (2013.01); *B60N 2/245* (2013.01); *B62D 25/2009* (2013.01); *B62D 51/02* (2013.01); *B62D 55/02* (2013.01); *B62D 55/06* (2013.01); *B62D 65/024* (2013.01)

(58) Field of Classification Search
CPC .. B62D 62/02; B62D 25/2009; B62D 65/024; B62D 55/075; B60N 2/00; B60N 2/245
USPC .............................. 180/9, 9.1; 414/474, 476
See application file for complete search history.

(56) References Cited

U.S. PATENT DOCUMENTS

| | | | | |
|---|---|---|---|---|
| 3,204,791 | A * | 9/1965 | Williams | ............... A61G 5/045 180/210 |
| 3,830,384 | A * | 8/1974 | Barber | .................. B60P 1/4414 414/556 |
| 3,921,740 | A * | 11/1975 | Forster | ................... A61G 3/061 180/213 |
| 4,077,483 | A * | 3/1978 | Randolph | ................ A61G 5/04 180/6.5 |

(Continued)

*Primary Examiner* — Tony H Winner
(74) *Attorney, Agent, or Firm* — Pierce Atwood LLP; Kevin M. Farrell; Christopher A. Baxter

(57) ABSTRACT

An off-road chair comprises a U-shaped chassis configured to receive a rider in a wheel chair type (manual or electric); at least one wheel attached to the chassis; and a floor section. The floor section is configured to attach to the bottom of the U-shaped chassis and to provide a floor; be lowered to provide a ramp for the rider to get on the floor section; and be raised to attach to a bottom part of the U-shaped chassis. The U-shaped chassis is configured to receive a wheel chair type (manual or electric) carrying the rider. The off-road chair further comprises a front bumper attached to a front of the U-shaped chassis, wherein the front bumper is configured to swing up with respect to the U-shaped chassis, enabling the rider to get on the floor section; and be lowered to lock to the chassis and protect the rider.

11 Claims, 16 Drawing Sheets

(56) References Cited

U.S. PATENT DOCUMENTS

| | | | | |
|---|---|---|---|---|
| 4,897,508 A | * | 1/1990 | Mahulikar | H01L 21/50 174/17 GF |
| 5,370,493 A | * | 12/1994 | Oshima | A61G 3/066 414/556 |
| 6,688,414 B1 | * | 2/2004 | Bruno | A61G 3/061 180/233 |
| 8,146,698 B2 | * | 4/2012 | Tahara | B60T 7/042 180/219 |
| 8,783,392 B2 | * | 7/2014 | Underwood | A61G 5/066 180/6.5 |
| 8,960,352 B2 | * | 2/2015 | Avigad | A61G 5/104 180/198 |
| 9,278,036 B2 | * | 3/2016 | Lee | A61G 5/066 |
| 2010/0133018 A1 | * | 6/2010 | Hertema | A61G 5/066 180/6.48 |

\* cited by examiner

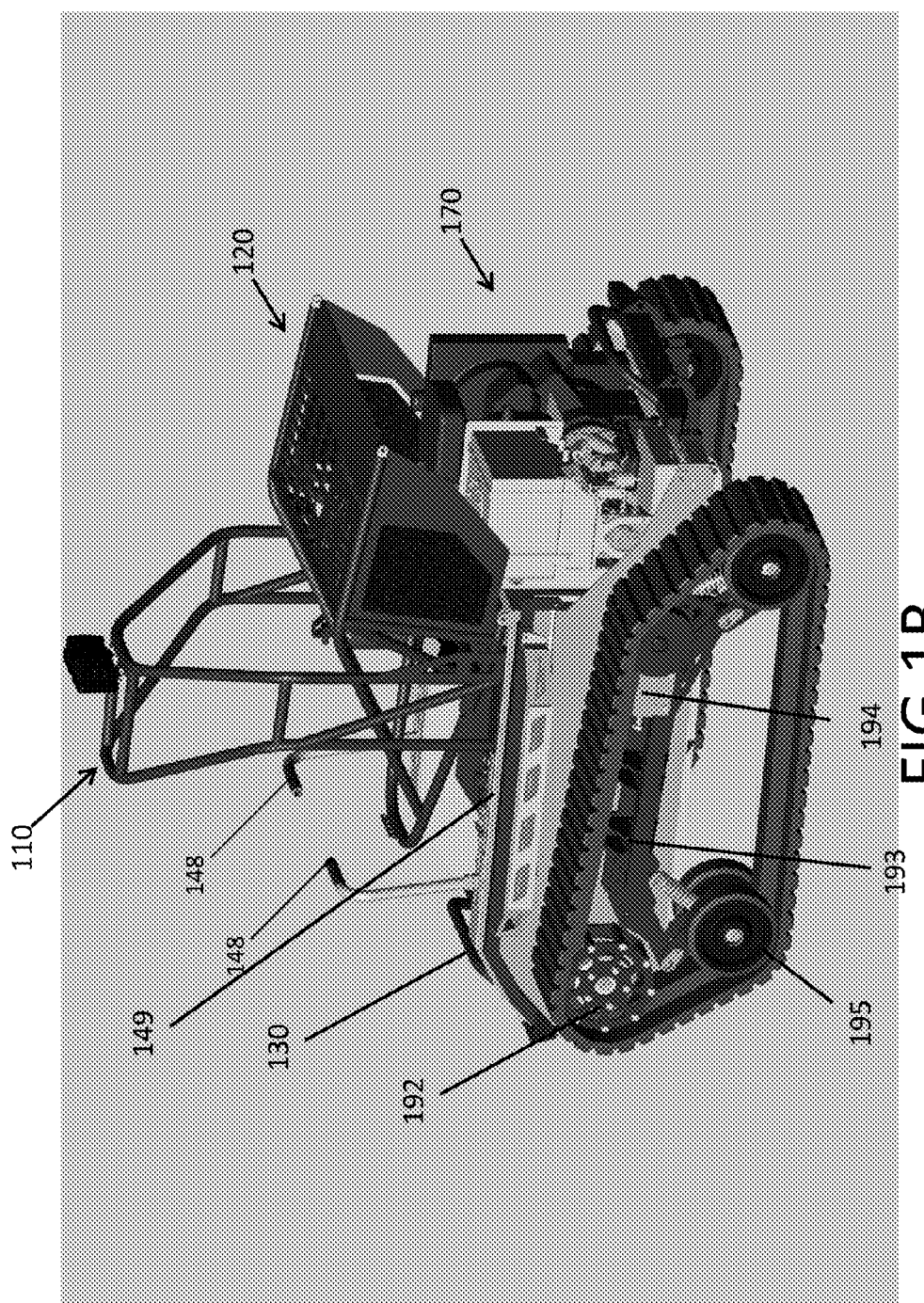

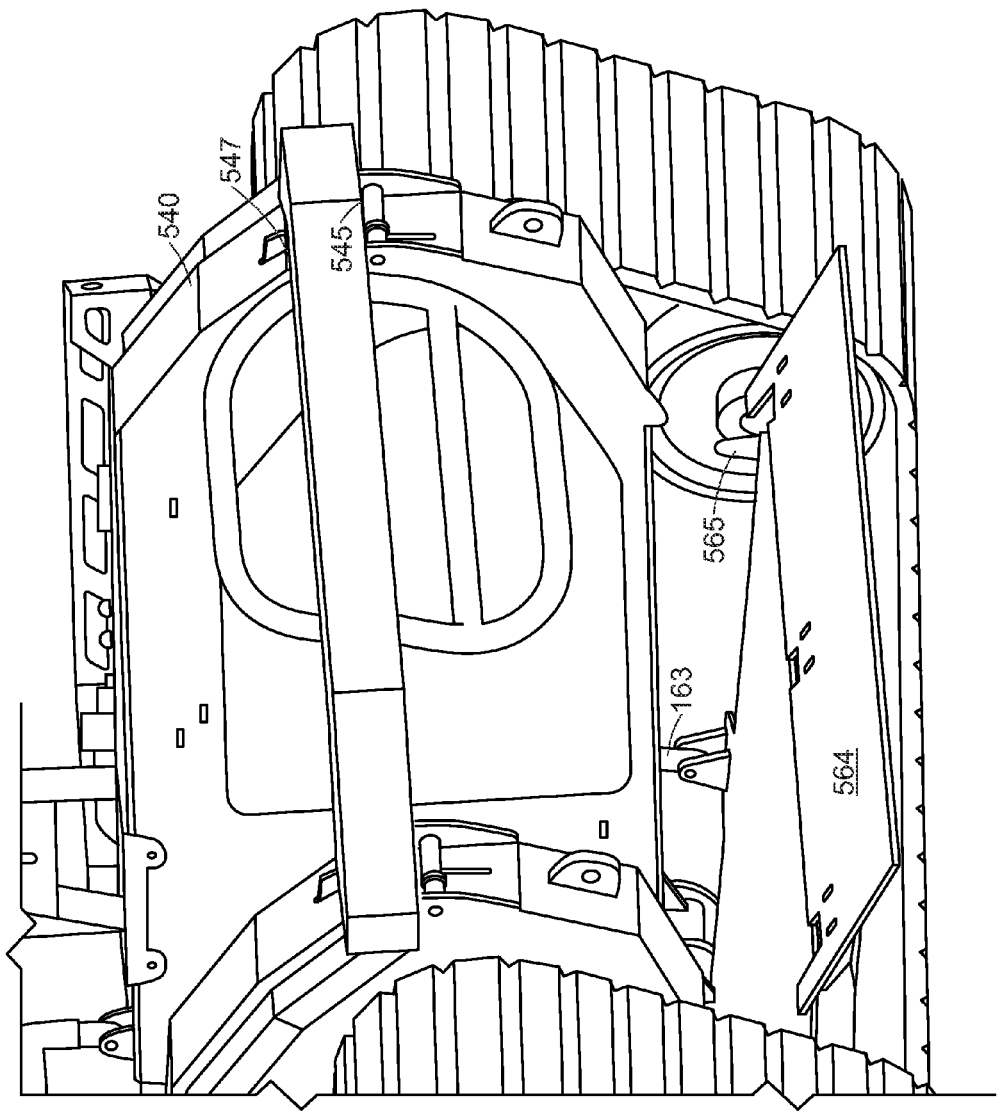

VERSATILE OFF-ROAD CHAIR

RELATED APPLICATION(S)

This non-provisional patent application claims the benefit of priority in, and incorporates by reference the entire content of, U.S. provisional application No. 62/032,009, filed Aug. 1, 2014, and entitled "Versatile Off Road Chair."

TECHNICAL FIELD

The present disclosure relates generally to versatile off-road chairs, and in particular to an off-road vehicle with a U-shaped chassis that enables users to get on and ride the vehicle with their wheelchair or other types of chairs.

BACKGROUND

Riders often use off-road vehicles to access rough terrains such as hills, snowy roads, uneven paths in forests, etc. Such terrains, however, are not accessible to disabled people that, for example, use a wheelchair. Similarly, a rider may wish to ride in such terrains while sitting in a power chair or a wheelchair that the rider can move in and out of the vehicle. The systems and methods of this disclosure address such and similar needs, as well as other improvements in off-road vehicles.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings:

FIGS. 1A-1E show different views of a versatile off-road vehicle, called Ripchair, according to some embodiments.

FIGS. 5A-5C illustrate some of the mechanisms used in combining the chassis with the front bumper and the lower section according to some embodiments.

DETAILED DESCRIPTION

Figure 1A:
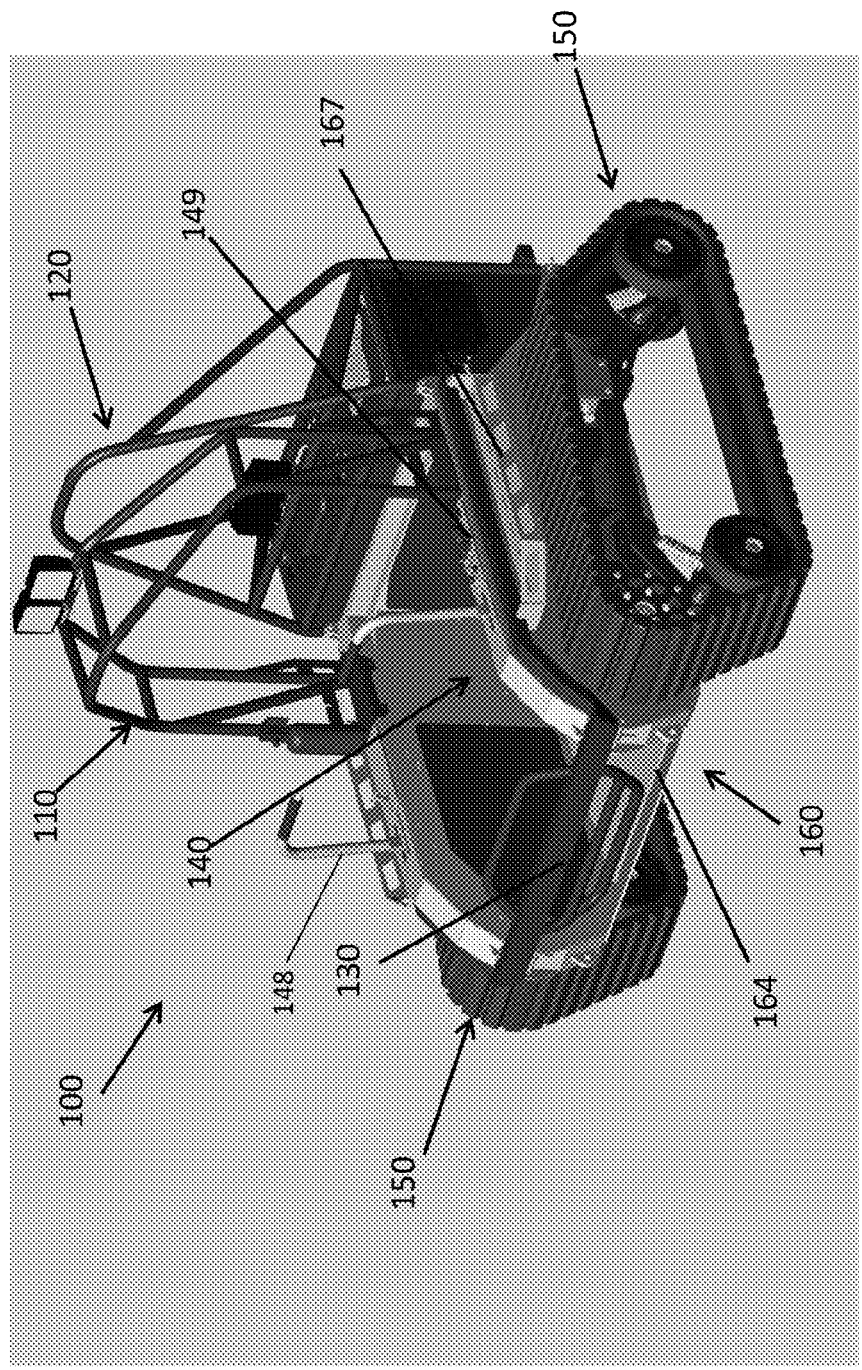
Figure 1C:
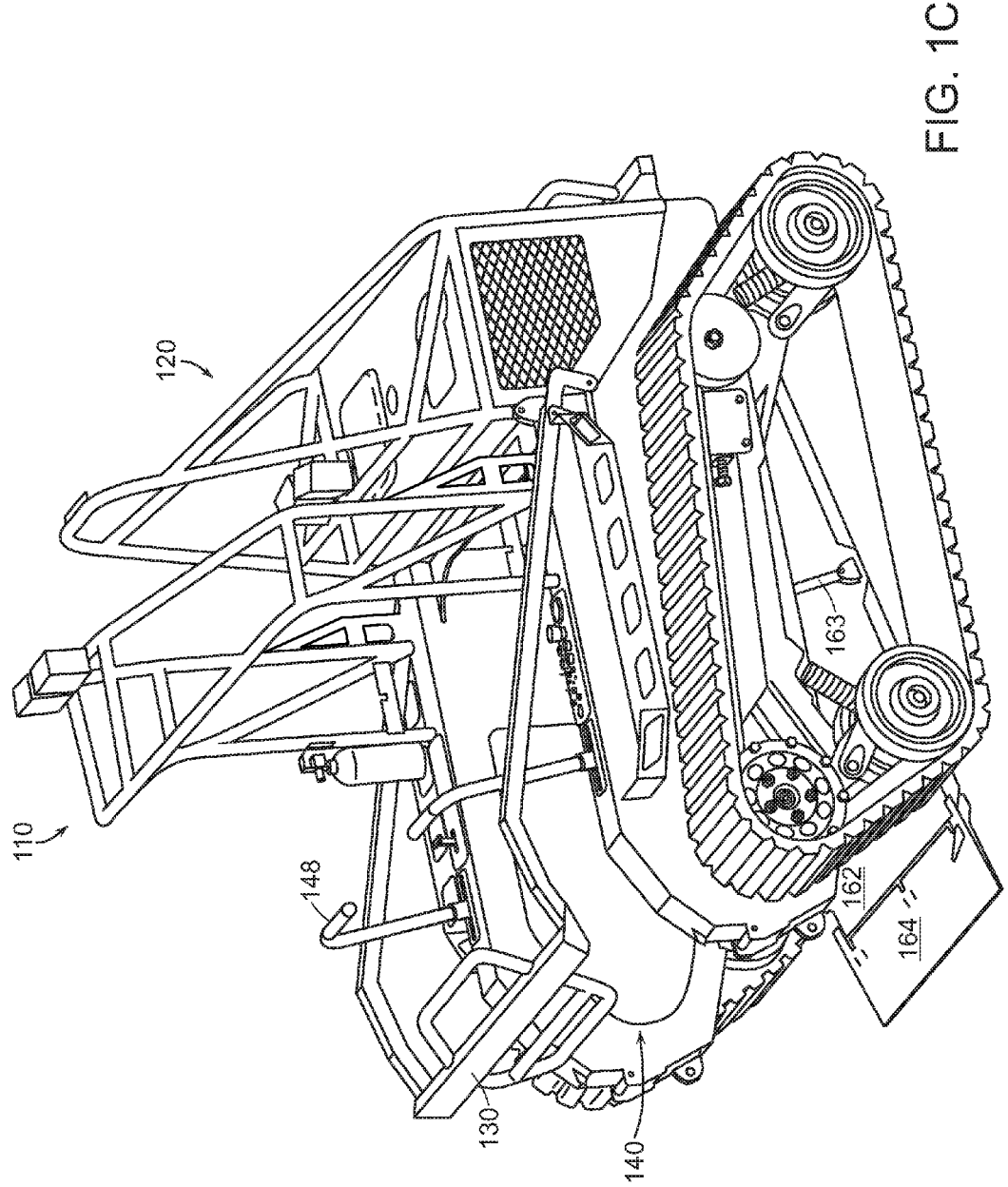
Figure 1D:
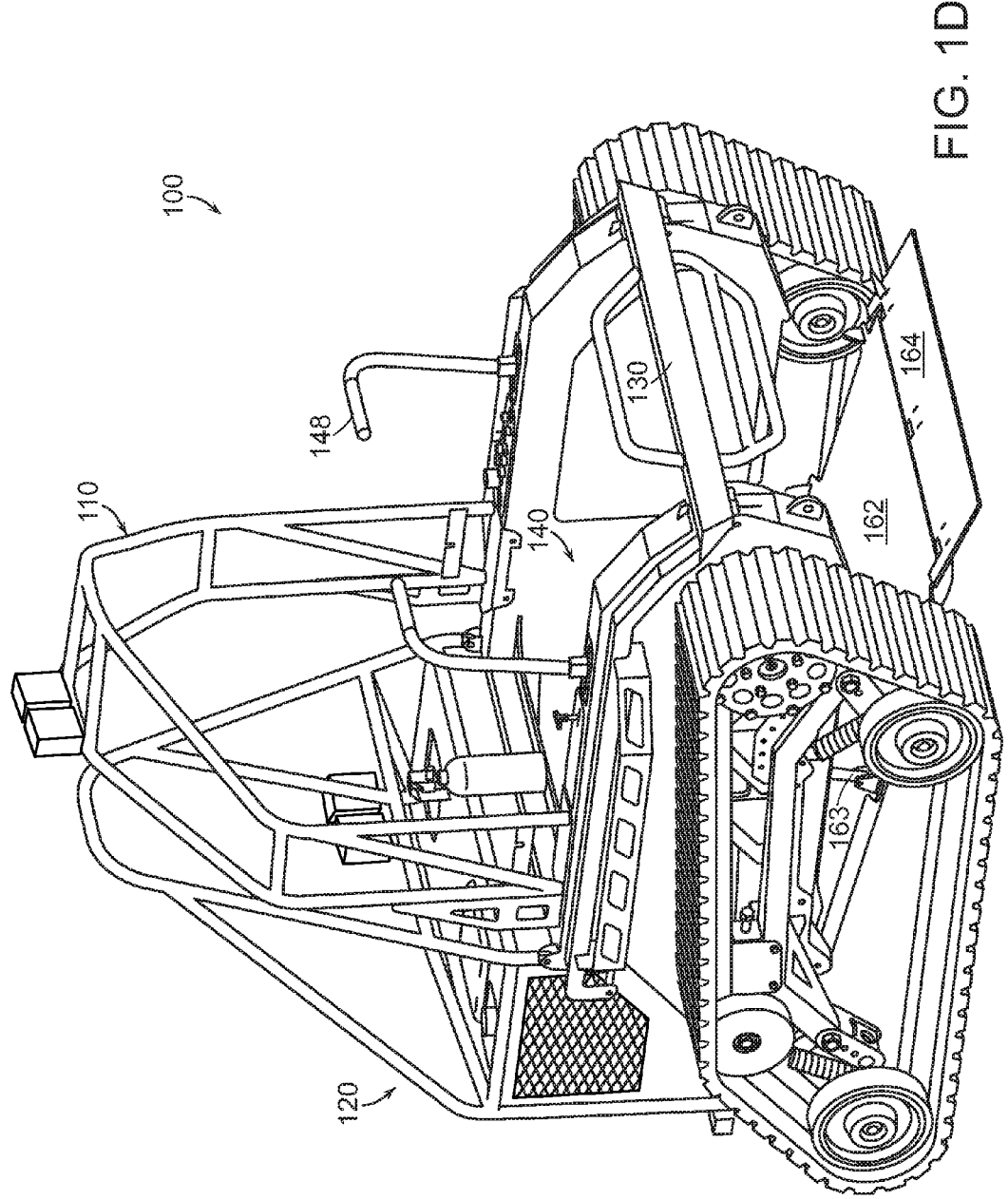

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Various embodiments disclose features of versatile off-road chairs. In some embodiments, a versatile off-road chair is called a Ripchair™. One example if a Ripchair is Ripchair 3.0 manufactured by Howe and Howe Technologies.

Various embodiments provide a unique off-road chair that combines different important features. One feature includes a shape that can receive and accommodate a power chair, wheelchair, or alike. Such feature is accomplished by having a U-shaped chassis with a ramp type floor that allows the chair to back up into the off-road chair. The other features is achieving rigidity and sturdiness for negotiating rough terrains despite the U-shaped chassis. These features are achieved by different parts that form the chassis, such as internal plates, or attach to the chassis, such as a front bumper or hinged floor. These features are further explained below.

FIGS. 1A-1E show different views of a Ripchair 100 according to some embodiments. In some embodiments, a Ripchair is able to carry one or more people. In some embodiments, the Ripchair can receive a wheelchair or in a chair. The Ripchair may lock in that wheelchair or chair, and carry it around. A person may sit in the wheelchair or the chair, and ride the Ripchair.

Ripchair 100 includes a top section 110, a top-back section 120, a front bumper 130, a U-shaped chassis 140, side track section 150, a floor section 160, an engine 170, and one or more fuel tanks 167. In some embodiments, side track section 150 may be replaced with wheels or similar structures.

Top back section covers engine 170. Floor section 160 forms a floor of the Ripchair. Floor section 160 includes a ramp composed of ramp floor 162 and ramp assist plate 164.

Attached to chassis 140, are steering handles 148, used for steering or accelerating Ripchair 100. In some embodiments, steering handles 140 are connected to a hinge point at their bottoms, where they are then connected to a push/pull cable. The push/pull cable connects to hydrostatic transmission control valves that cause acceleration or deceleration of the Ripchair.

Chassis 140 further includes a console area 149. Console area 149 includes controls such as buttons and knobs for operating Ripchair 100. These controls may be configured for different operations such as switching the Ripchair on or off. Console area 149 may also hold a shaft mount motion controller designed for operators that do not have full use of their hands.

Side track section 150 includes sprocket 192, suspension carrier 193, tension bracket 194, dogleg assembly 195, and suspension spring 196.

Figure 1E:
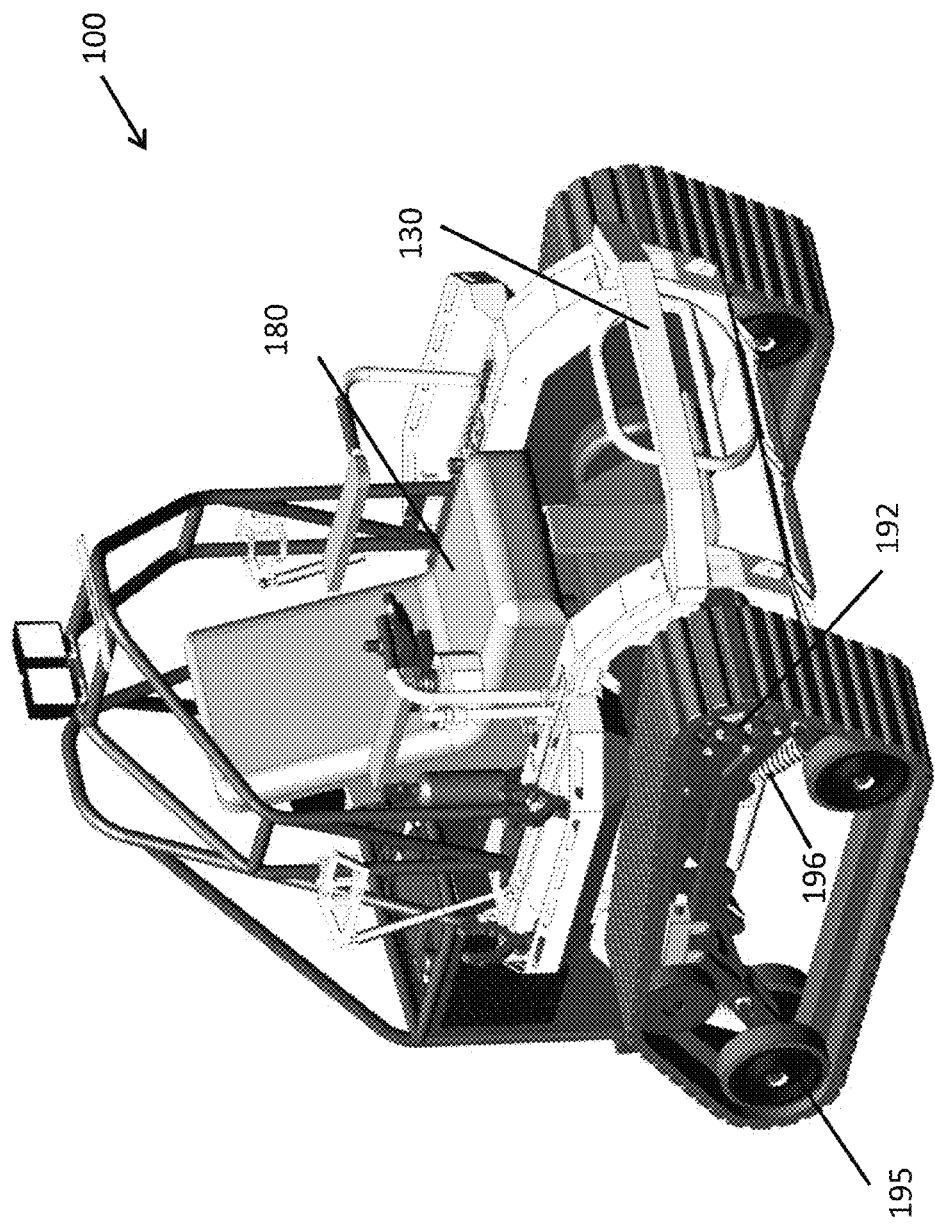

FIG. 1E shows a chair 180 positioned inside a Ripchair 100 according to an embodiment. Chair 180 may, for example, be a wheelchair (manual or electric) in which a person sits and rides Ripchair 100. The person, may, for example back up wheelchair 180 into the riding area in the center of chassis 140 to be get positioned inside Ripchair 100.

Figure 2:
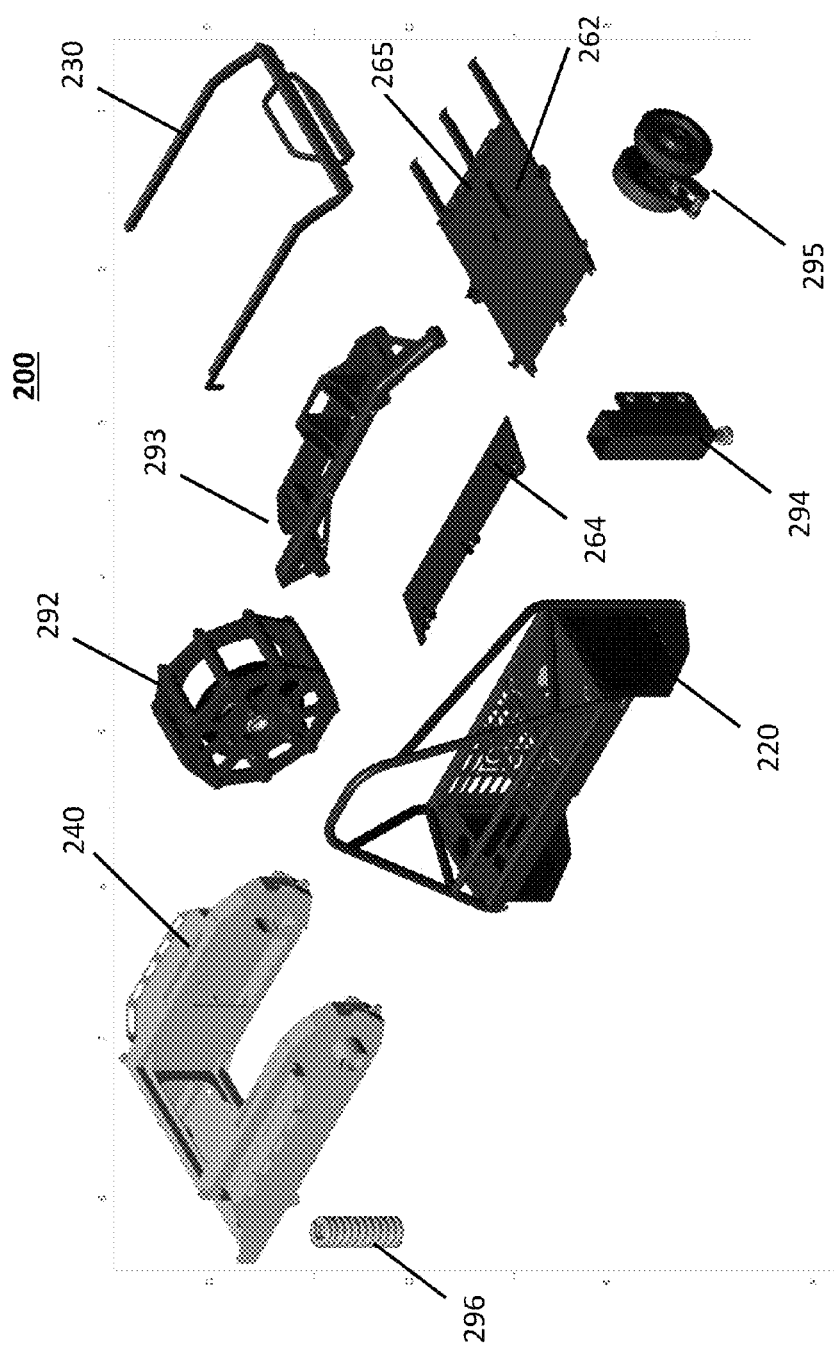
FIG. 2 shows a part set that includes different parts of a Ripchair according to some embodiments.

FIG. 2 shows a part set 200 that includes different parts of a Ripchair according to some embodiments. Part set 200 includes a top-back section 220, a front bumper 230, a chassis 240, a ramp floor 262, a ramp assist plate 264, a front sprocket 292, suspension carrier 293, track tension bracket 294, dogleg assembly 295, and suspension spring 296.

Ramp assist plate 264 attaches to the front of ramp floor 262 to form the floor section. Ramp assist plate 264 may be hinged to the front of ramp floor 262, such that it can move up and down. Moreover, in some embodiments, ramp floor 262 includes chair lock 265. Chair lock 265 provides a lock to which a chair can lock when the chair enters the Ripchair and is positioned on floor section 260. In some embodiments, the chair may be a wheelchair, and chair lock 265 may be a wheelchair lock for locking the wheelchair to the floor.

The parts may be assembled together to enable different features of the Ripchair, as further described below. In some embodiments, one or more of the parts are made from aerospace grade aluminum and designed for high strength and low weight.

Figure 3A:
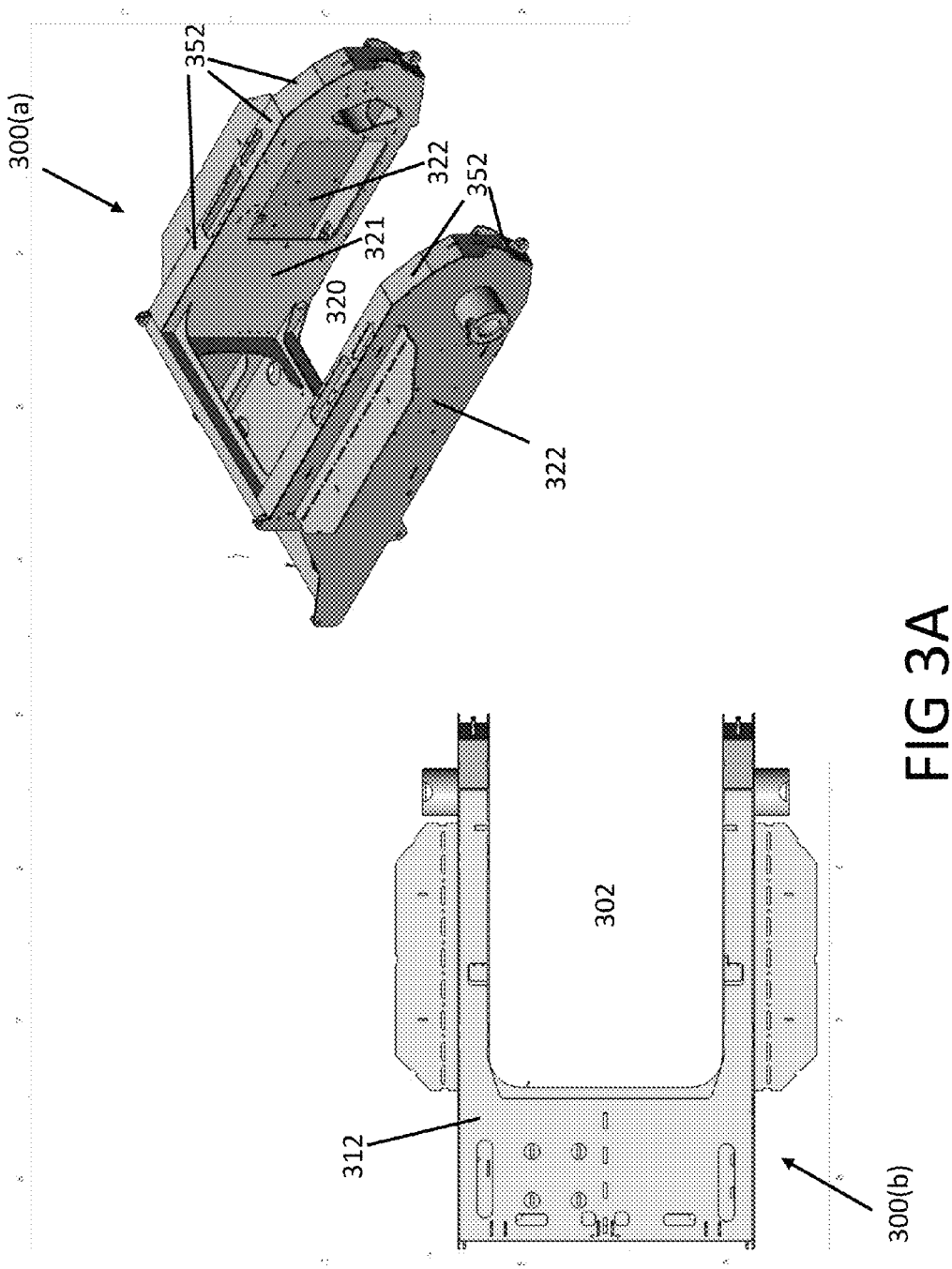
FIGS. 3A-3D show different views of a U-shaped chassis according to some embodiments.

FIGS. 3A-3D show different views of a U-shaped chassis 300 according to some embodiments. In particular, FIG. 3A shows a profile view (300(a)) and a bottom view (300(b)) of chassis 300. The U shape of the chassis enables many of the functionalities of the Ripchair according to some embodiments. As seen, the U-shaped chassis provides a riding area 302 in the middle. The U shape and riding area 302 allow for the Ripchair to encompass or surround another vehicle or chair. To drive the Ripchair, a user may enter and ride in riding area 302 on foot, or in a vehicle such as a wheelchair, chair, etc.

In some embodiments, chassis 300 is built from parts and in shapes that add structure and flexibility to the chassis, such that it can stand torques and pressures during rides in uneven and rough terrains. The structure acts as a rigid frame that allows for chassis 300 to resist vertical and horizontal deformation forces.

Figure 3B:
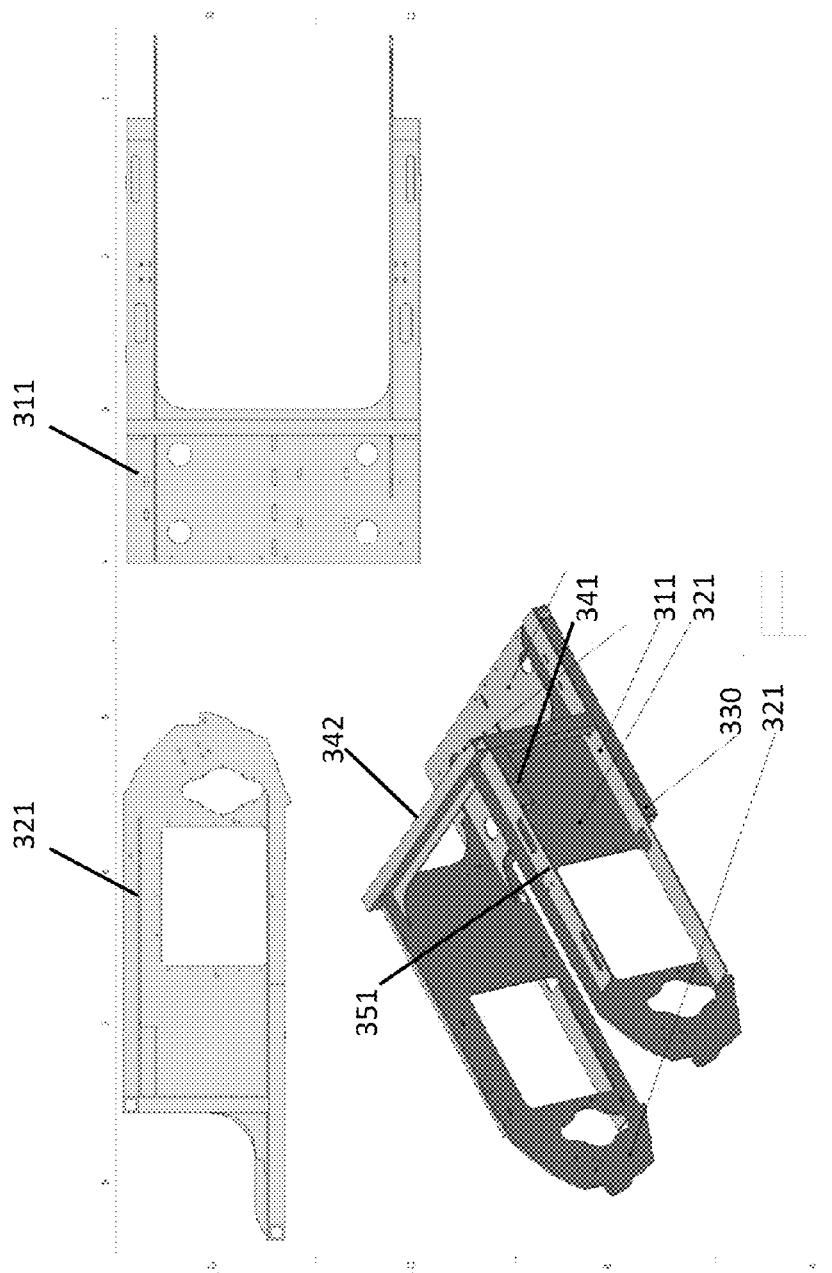
Figure 3C:
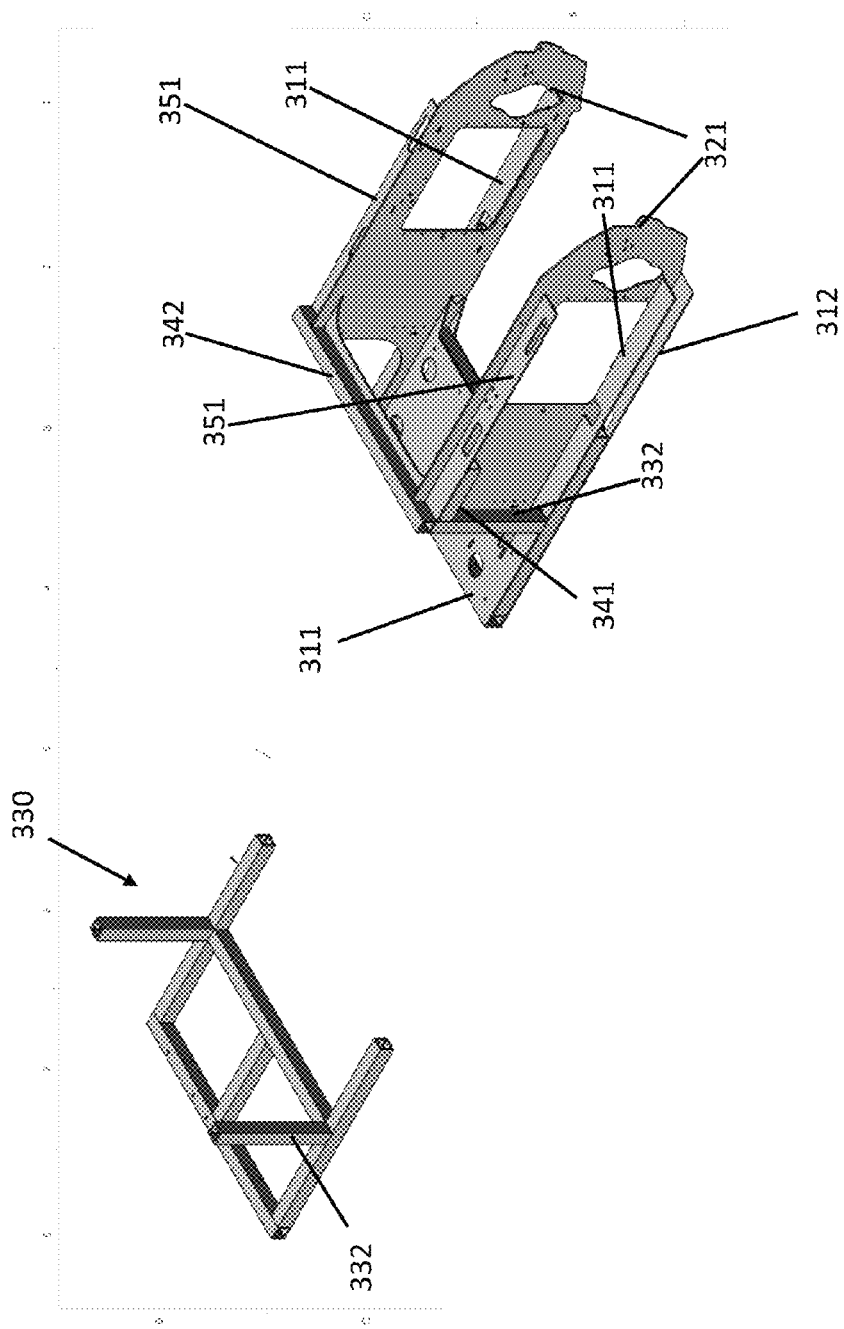
Figure 3D:
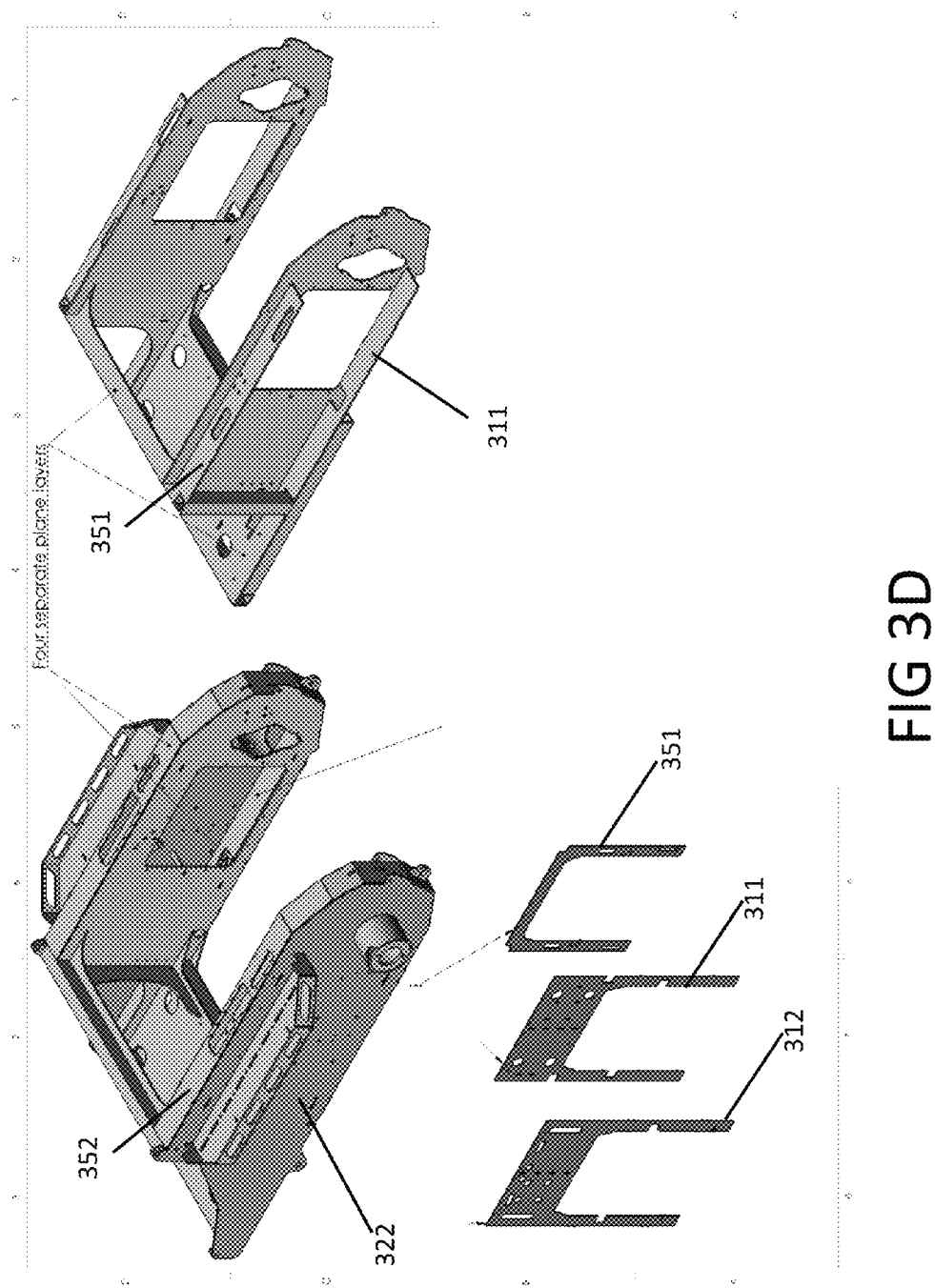

In particular, as seen in FIGS. 3B-3D, chassis 300 includes an upper floor plate 311, lower floor plate 312, two inner walls 321, two outer walls 322, a backbone 330, three top bars that include two armrest support bars 341 and one cross top bar 342, a lower armrest plate 351, and an upper armrest plate 352. Upper and lower floor plates are both U-shaped, in that they accommodate and form parts of riding area 302. Similarly, lower and upper armrest pates 351 and 352 are both U-shaped and form the structure on which console area 149 is installed. In chassis 300, four plates that are installed horizontally provide separate enforcement planes, and add rigidity and strength to chassis 300. These horizontal plates are, from bottom to top, lower floor plate 312, upper floor plate 311, lower armrest plate 351, and upper armrest plate 352. These horizontal plate also all U-shaped, in that each of them forms a U-shaped open area that forms part of the riding area 302.

Further, backbone 330 acts as an anchoring point for the entire structure. In some embodiments, backbone 330 is made of square tubes.

In addition to their versatility and sturdiness, the off-road chairs of the embodiments may be built in an economical and efficient manner. Many of their parts, for example, can be cut from flat plates, bent or folded if necessary, and then attached together.

Figure 4A:
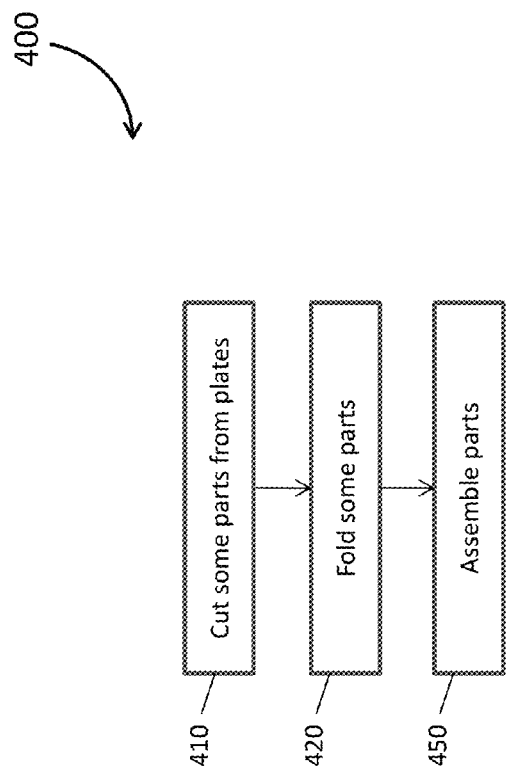
FIGS. 4A and 4B show flowcharts for building and assembling a chassis according to some embodiments.
Figure 4B:
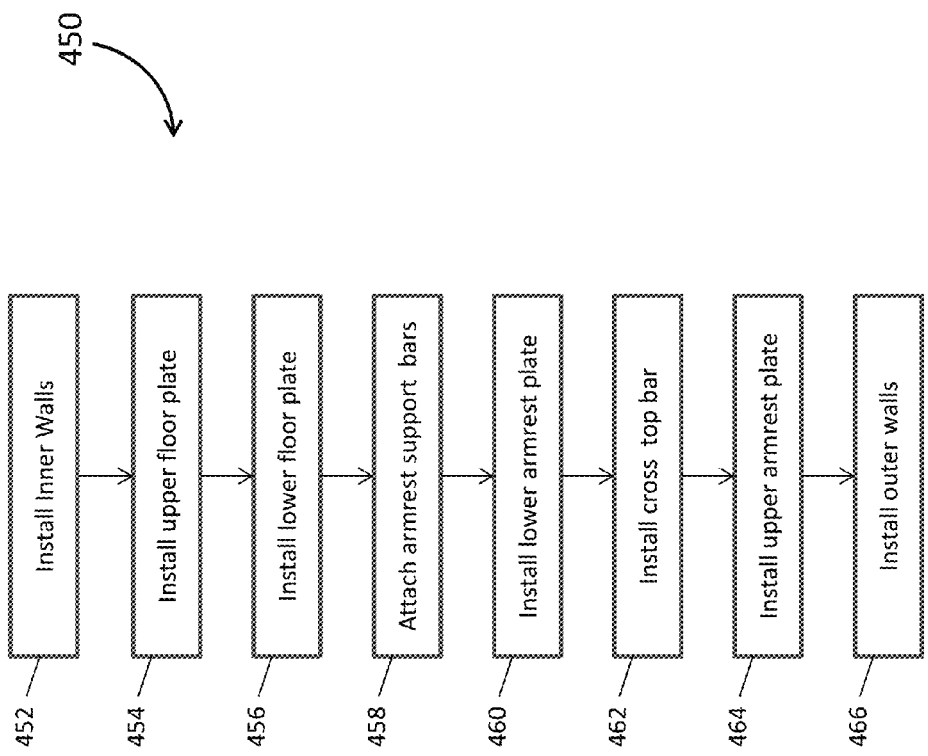

For example, in some embodiments, chassis 300 of FIGS. 3A-3D can be built and assembled in an efficient manner. FIGS. 4A and 4B show flowcharts 400 and 450, which illustrates the building and assembly of the parts according to some embodiments.

In FIG. 4A, step 410, many parts of chassis 300 are cut from a flat metallic plate in the desired form. In some embodiments, these parts are cut by a precision from one or more flat metallic plates. The parts that can thus be cut may include upper and lower floor plates, inner and outer walls, and lower and upper armrest plates. In addition, some other parts of the Ripchair, such as the fuel tank, may also be cut from flat metallic plates. After cutting these parts from flat plates, tongues or grooves may also be cut in specific parts of the plates.

In some embodiments, the metallic plates are aluminum plates. The metallic plate may also be made of different types of steel, titanium, etc. Moreover, some embodiments use a flow waterjet to accurately cut the different parts, and their grooves or tongue. In some embodiments, the accuracy of the flow waterjet device is about 0.002-0.003 of an inch.

Some other parts of the Ripchair may not be cut out of flat plates. Those parts include, for example, the backbone, armrest support bars, or cross top bar. These three types of parts, for example, may be cut out of metallic tubes. For the backbone, the metallic tubes are welded together to form the backbone.

In step 420, some of the parts folded to their desired shapes. For example, the upper armrest plate may be folded along folding lines seen in, e.g., FIG. 3A. Similarly, the cut plate for the fuel tank may be folded to form the fuel tank.

In step 430, the parts that are thus prepared are assembled to form the chassis, as further detailed in FIG. 4B FIG. 4B shows a flowchart 450 showing the steps included in an assembly of chassis parts according to some embodiments.

In step 452, inner walls 321 are placed and attached inside of backbone 330 as shown in, e.g., FIGS. 3B-3D. In step 454, upper floor plate 311 is installed in place, as also shown in FIGS. 3B-3D. In some embodiments, the upper floor plate is installed by fitting into corresponding grooves located in inner walls 321.

In step 456, lower floor plate 312 is installed below backbone 330. In some embodiments, the lower floor plates also fits into corresponding grooves in inner walls 321.

In step 458, two armrest support bars 341 are attached to backbone 330. In some embodiments, the armrest support bars are welded to vertical arms 332 of the backbone.

In step 460, lower armrest plate 351 is installed. In some embodiments, the lower armrest plate is attached to inner walls 321 by fitting into corresponding grooves.

In step 462, cross top bar 342 is installed by, for example, being welded in place.

In step 464, upper armrest plate 352 is installed. In some embodiments, the upper armrest plate is also attached to inner walls 321 by fitting into corresponding grooves.

In step 466, two outer walls 322 are attached outside the above assembled parts to complete building chassis 300.

In some embodiments, the above-listed parts may be assembled in a different order. For example, instead of steps 452 and 454, upper floor plate 311 may be first attached to two inner walls 321. Backbone 330 may then be installed by sliding two vertical arms 332 up the corresponding slots in upper floor plate 311. After that, lower floor plate 312 may be installed in the manner described in step 456.

As explained above, assembling chassis 300 requires few steps that include some interlocking of parts by, e.g., fitting tongues into grooves. After being fitted in place, the parts may further be welded along their contacts to strengthen the attachment.

Moreover, to make manufacturing the Ripchair faster, easier, and more accurate, the chassis is designed using plate pieces of material that are notched to fit other flat pieces.

Figure 5A:
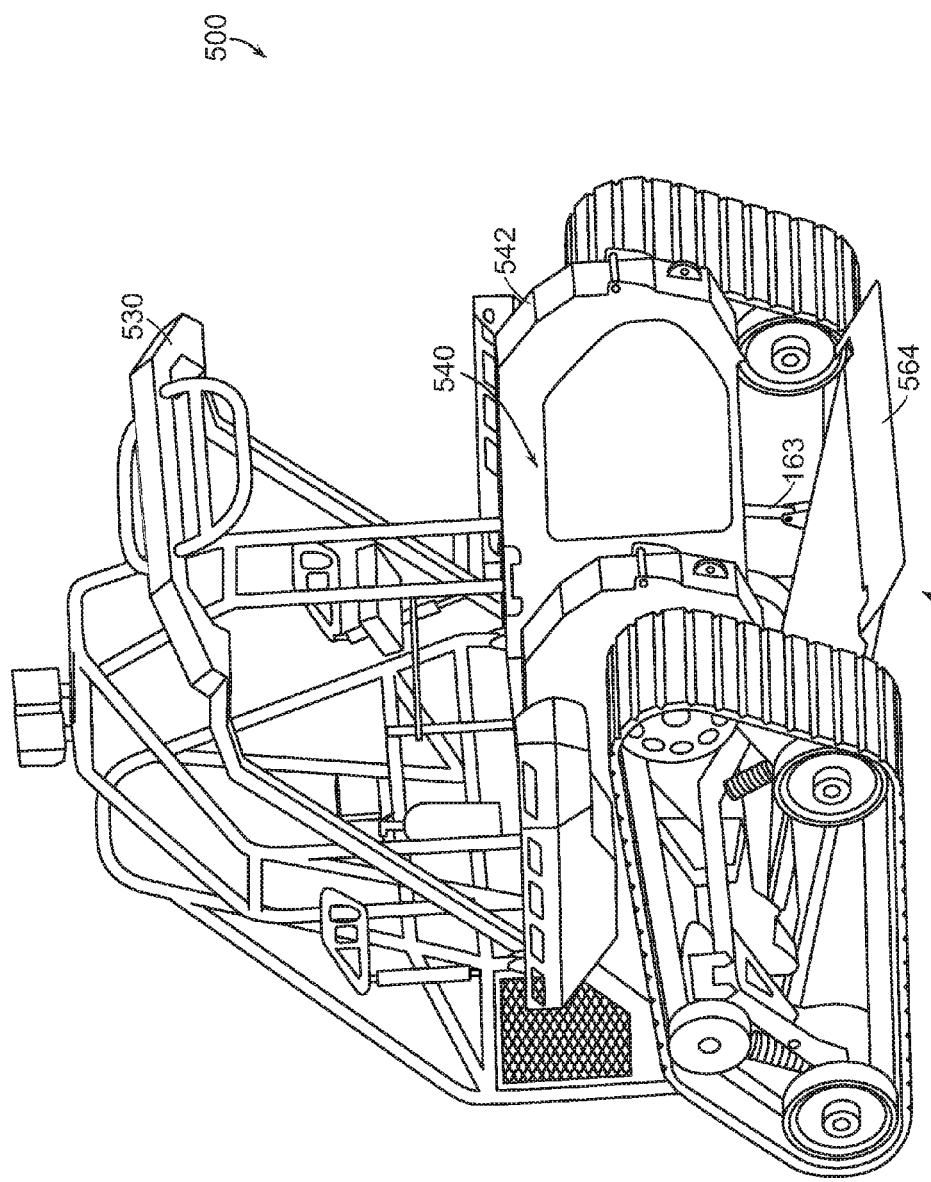
Figure 5B:
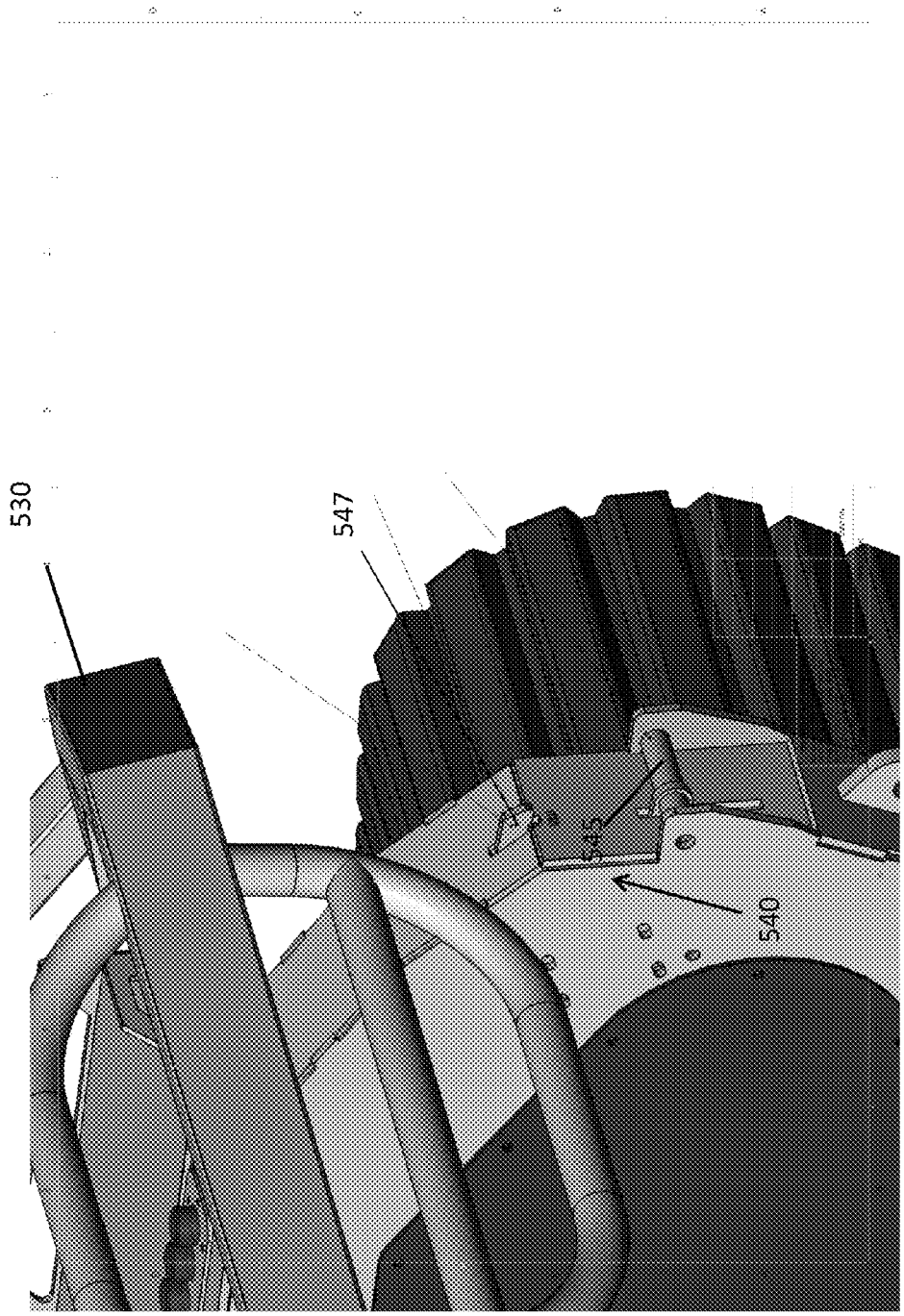

FIGS. 5A-5C illustrate some of the mechanisms used in combining the chassis with the front bumper and the lower section according to some embodiments. In particular, FIG. 5A shows a view of a Ripchair 500 according to an embodiment. Ripchair 500 includes front bumper 530, chassis 540, and lower section 560. Lower section 560 includes a floor section having a ramp 564. Chassis 540 includes two side walls 542 on its two sides. Side walls 542 include the two inner walls, the two outer walls, and the console area discussed above.

Front bumper 530 is hinged to the back of chassis 540. Front bumper 530 is configured to swing down to be placed in front of side wall 542. When the bumper swings down and into place, the bumper is locked by hinged fingers that connect to solenoid actuators located on chassis 540.

During operation, front bumper 530 may be brought down and locked to chassis 540 for safety reasons. Such lowered front bumper is shown, for example, in FIGS. 1A, 1B, 1D, and 1E, The lowered front bumper 530 may protect a passenger of the Ripchair from, for example, being thrown out of the Ripchair due to a forward thrust. In this configuration, front bumper 530 also adds support for forces that act backward against the bumper, and adds structural support to U-Shaped chassis 540.

Moreover, front bumper 530 is configured to swing up, as shown in FIG. 5A. This lifted front bumper 530 allows, for example, a passenger to get on or off Ripchair. In this case, with front bumper 530 up and ramp 564 down, a user can backup a wheelchair or a power chair into Ripchair 500. Ramp 564, in its down position via at least one actuator 163 as shown in FIG. 5A, provides a bridge for such getting on or off.

After getting on Ripchair 500, a user may bring down bumper 530 and lift up ramp 564 via at least one actuator 163. The user can then operate Ripchair 500.

In some embodiments, the lowered bumper 530 locks into place by hinged fingers that connect to solenoid actuators. FIG. 5B shows some specifics of an interlocking mechanism between front bumper 530 and chassis 540 according to some embodiments. In particular, chassis 540 has a moving lock part that includes a lock hinge 545 and a lock tongue 547. As shown in FIG. 5C, when the front bumper comes down, it rests over lock hinge 545. Moreover, an internal spring pushed out lock tongue 547, which rests on top of the front bumper and prevents it from moving up. The front bumper is thus locked in place.

To unlock the front bumper, the rider may operate a corresponding switch. The corresponding switch may activate a solenoid inside chassis. The solenoid may in turn pull back lock tongue 547, thus releasing the front bumper and allowing it to move up. Alternatively, if for example the solenoid fails, a user may release the lock by pushing back the lock tongue 547.

FIG. 5C shows some specifics of an interlocking mechanism between ramp 564 and chassis 540. In particular, ramp 564 includes one or more tongues 565. When ramp 564 is lifted up via at least one actuator 163, tongue 565 enters slots in the matching parts under chassis 540. This interlocking cause lower section 560 to attach to chassis 540 and add to its reinforcement against external deforming forces.

Figure 6:
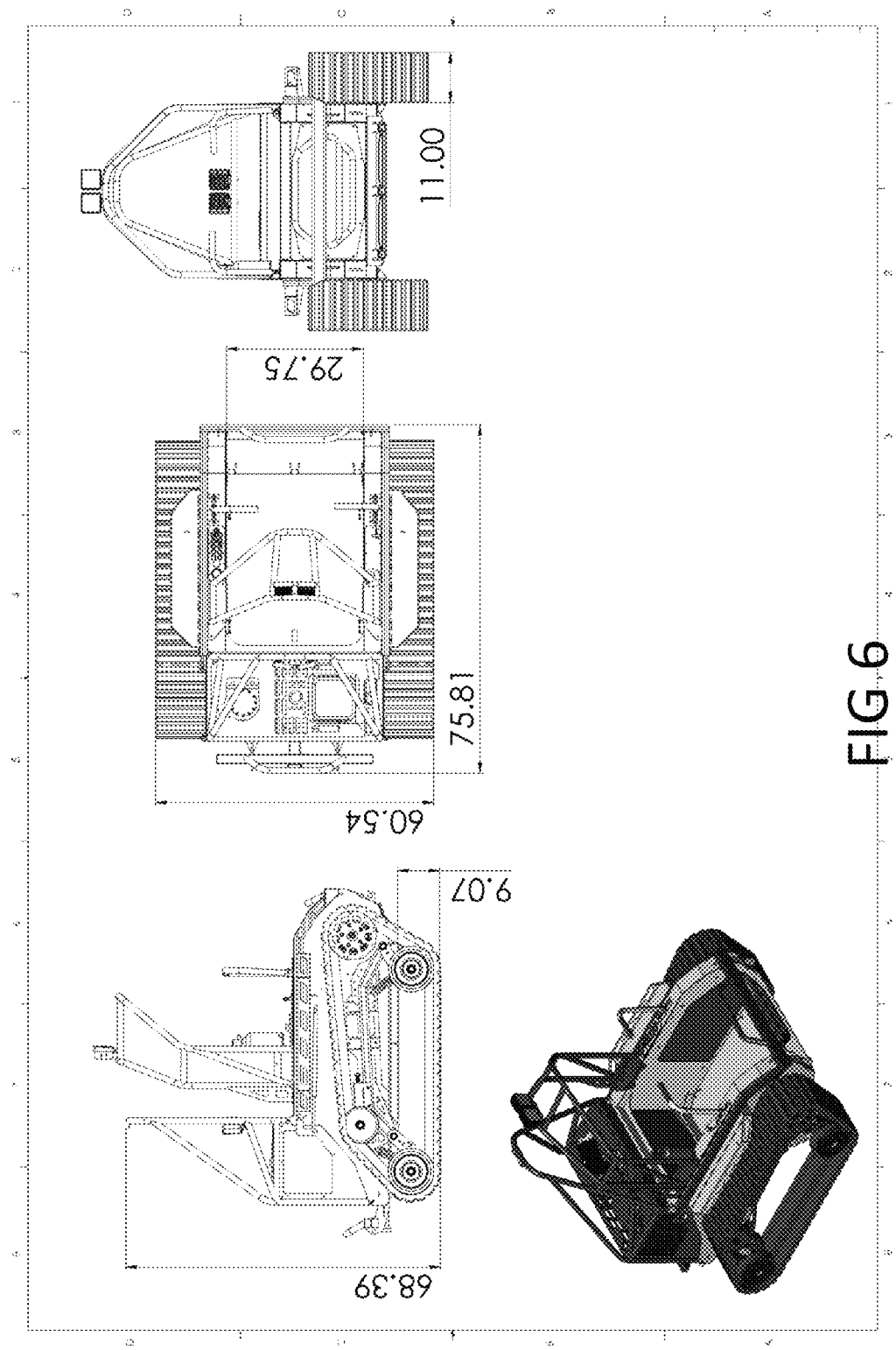
FIG. 6 is a dimension drawing, showing dimensions of a Ripchair according to one embodiment.

FIG. 6 is a dimension drawing, showing some details and dimensions of a Ripchair according to one embodiment. In FIG. 6, the dimensions are shown in inches.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set.

The invention claimed is:

1. An off-road vehicle comprising:
a U-shaped chassis configured to receive a rider;
at least one wheel attached to the chassis;
a floor section hingedly coupled to the U-shaped chassis at a rear of the off-road vehicle; and
a front bumper coupled to a front of the U-shaped chassis, wherein the front bumper is configured to:
swing up with respect to the U-shaped chassis, enabling the rider to get on the floor section; and
be lowered to protect the rider.

2. The off-road vehicle of claim 1, wherein the at least one wheel includes two side tracks.

3. The off-road vehicle of claim 1, wherein the U-shaped chassis is configured to receive a chair carrying the rider.

4. The off-road vehicle of claim 2, wherein the floor section comprises:
a ramp floor for positioning the rider; and
a ramp assist plate configured to form a bridge to the ramp floor, enabling the chair to wheel into the ramp floor.

5. The off-road vehicle of claim 4, wherein the ramp floor comprises a chair lock enabling the chair to be locked to the floor.

6. The off-road vehicle of claim 1, further comprising:
an engine;
a top section; and
a top-back section attached to the top section and configured to cover the engine.

7. The off-road vehicle of claim 1, wherein the front bumper, when lowered, further locks to the U-shaped chassis.

8. The off-road vehicle of claim 1, wherein the U-shaped chassis forms a riding area in a middle part, and further comprises:
a backbone;
at least one U-shaped horizontal plate configured to be attached to the backbone in a horizontal direction and to add rigidity to the U-Shaped chassis; and
a plurality of walls configured to be attached to the backbone in vertical directions.

9. The off-road vehicle of claim 8, wherein:
the at least one horizontal plate includes a plurality of floor plates configured to attach to a lower part of the backbone.

10. The off-road vehicle of claim 9, wherein:
the at least one horizontal plate further includes a plurality of armrest plates configured to attach to an upper part of the backbone.

11. The off-road vehicle of claim 8, wherein the plurality of walls include:
two inner walls configured to be attached to an inside side of the backbone closer to the riding area; and two outer walls configured to be attached to an outer side of the backbone further from the riding area compared to the inner side.

\* \* \* \* \*